United States Patent
Inoue

(10) Patent No.: US 12,254,362 B2
(45) Date of Patent: Mar. 18, 2025

(54) INFORMATION PROCESSING APPARATUS, METHOD, AND STORAGE MEDIUM THAT CHANGE A PAPER SIZE FROM A FIRST SIZE TO A DIFFERENT, SECOND SIZE, AND TO MAINTAIN AN ASPECT RATIO OF AN OBJECT

(71) Applicant: CANON KABUSHIKI KAISHA, Tokyo (JP)

(72) Inventor: Yuichi Inoue, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/520,675

(22) Filed: Nov. 28, 2023

(65) Prior Publication Data
US 2024/0176971 A1 May 30, 2024

(30) Foreign Application Priority Data
Nov. 30, 2022 (JP) .................... 2022-191881

(51) Int. Cl.
*G06K 15/02* (2006.01)
*G06K 15/00* (2006.01)

(52) U.S. Cl.
CPC ..... *G06K 15/1807* (2013.01); *G06K 15/4065* (2013.01)

(58) Field of Classification Search
CPC ......... C08G 77/12; C08G 77/20; C08L 83/00; C08L 83/04; C09J 183/04; C09J 183/14; C09J 2467/006; C09J 2483/00; C09J 7/255; C09J 2301/302; C09J 2301/312; C09J 7/22; C09J 7/38; G06F 40/106; G06K 15/4065

USPC .......................................... 358/474
See application file for complete search history.

(56) References Cited

U.S. PATENT DOCUMENTS

| | | | |
|---|---|---|---|
| 6,879,943 B1 * | 4/2005 | Shigemori | G06F 40/106 703/2 |
| 6,915,484 B1 * | 7/2005 | Ayers | G06F 40/191 345/666 |
| 8,164,762 B2 * | 4/2012 | Rizzo | H04N 1/393 358/1.11 |
| 8,917,415 B2 * | 12/2014 | Scrafford | G06K 15/4065 358/1.18 |

(Continued)

FOREIGN PATENT DOCUMENTS

JP 2000322224 A 11/2000

*Primary Examiner* — Negussie Worku
(74) *Attorney, Agent, or Firm* — Venable LLP

(57) ABSTRACT

An information processing apparatus for editing a document including first and second types of different objects. The apparatus includes at least one processor and at least one memory coupled to the at least the processor and having stored thereon instructions, when executed by the at least the processor, and cooperating to act as a change unit configured, based on a user instruction, to change a paper size of the document from a first paper size to a second, different from the first, and an adjustment unit configured to adjust a size of the object included in the document based on the second. The adjustment unit adjusts the size of a first type of object in the plurality of objects such that an aspect ratio of the specific object is maintained and an aspect ratio of the second type of object corresponds to an aspect ratio of the second paper size.

12 Claims, 10 Drawing Sheets

(56) References Cited

U.S. PATENT DOCUMENTS

| | | | |
|---|---|---|---|
| 2004/0051893 A1* | 3/2004 | Yoshida | G06K 15/1827 358/1.11 |
| 2012/0120421 A1* | 5/2012 | Mochizuki | G06F 3/1256 358/1.9 |
| 2012/0300225 A1* | 11/2012 | Scrafford | G06K 15/186 358/1.2 |
| 2014/0333942 A1* | 11/2014 | Kobashi | G06F 3/1247 358/1.2 |
| 2015/0002572 A1* | 1/2015 | Maeda | B41J 11/008 347/16 |
| 2022/0131981 A1* | 4/2022 | Hasama | H04N 1/00427 |
| 2024/0311957 A1* | 9/2024 | Hirosugi | G06F 3/14 |

* cited by examiner

F I G. 5

| | IS THERE ANOTHER OBJECT AT IMMEDIATELY UNDER? | CONTACTS EDGE OF PAPER SHEET? | SCALING PROCESSING | MOVEMENT PROCESSING |
|---|---|---|---|---|
| TEXT | × | — | ENLARGE/REDUCE FONT SIZE IN ACCORDANCE WITH MAGNIFICATION OF SIDE OF PAPER SHEET WITH LOWER SCALING RATIO ※ MAINTAIN ASPECT RATIO | MOVE IN ACCORDANCE WITH CHANGE OF ASPECT RATIO OF PAPER SIZE |
| | ○ | — | ENLARGE/REDUCE FONT SIZE MAINTAINING SIZE RELATIONSHIP RELATIVE TO ANOTHER OBJECT IMMEDIATELY UNDER ※ MAINTAIN ASPECT RATIO | MOVE MAINTAINING RELATIVE POSITIONAL RELATIONSHIP WITH ANOTHER OBJECT OF IMMEDIATELY UNDER |
| FIGURE | × | × | ENLARGE/REDUCE IN ACCORDANCE WITH MAGNIFICATION OF SIDE OF PAPER SHEET WITH LOWER SCALING RATIO ※ MAINTAIN ASPECT RATIO | MOVE IN ACCORDANCE WITH CHANGE OF ASPECT RATIO OF PAPER SIZE |
| | ○ | × | ENLARGE/REDUCE MAINTAINING SIZE RELATIONSHIP RELATIVE TO ANOTHER OBJECT IMMEDIATELY UNDER ※ MAINTAIN ASPECT RATIO | MOVE MAINTAINING RELATIVE POSITIONAL RELATIONSHIP WITH ANOTHER OBJECT OF IMMEDIATELY UNDER |
| | — | ○ (EXCEPT TWO-DIMENSIONAL CODE) | ENLARGE/REDUCE MAINTAINING RATIO OF OBJECT CORRESPONDING TO WHOLE PAPER SHEET ※ DO NOT MAINTAIN ASPECT RATIO | MOVE MAINTAINING RATIO OF OBJECT CORRESPONDING TO WHOLE PAPER SHEET |
| IMAGE | × | — | ENLARGE/REDUCE MAINTAINING RATIO OF OBJECT CORRESPONDING TO WHOLE PAPER SHEET ※ DO NOT MAINTAIN ASPECT RATIO OF ARRANGEMENT REGION OF IMAGE | MOVE MAINTAINING RATIO OF OBJECT CORRESPONDING TO WHOLE PAPER SHEET |
| | ○ | — | ENLARGE/REDUCE MAINTAINING RELATIVE SIZE RELATIONSHIP TO OBJECT IMMEDIATELY UNDER ※ DO NOT MAINTAIN ASPECT RATIO OF ARRANGEMENT REGION OF IMAGE | MOVE MAINTAINING RELATIVE POSITIONAL RELATIONSHIP WITH ANOTHER OBJECT OF IMMEDIATELY UNDER |

FIG. 6
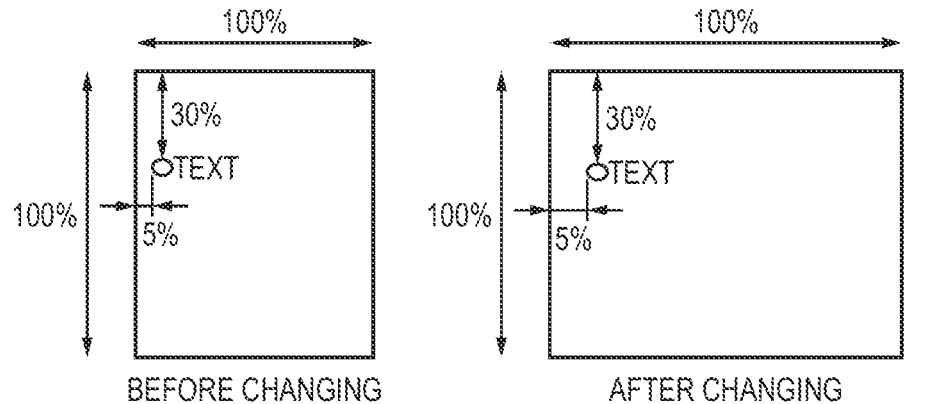
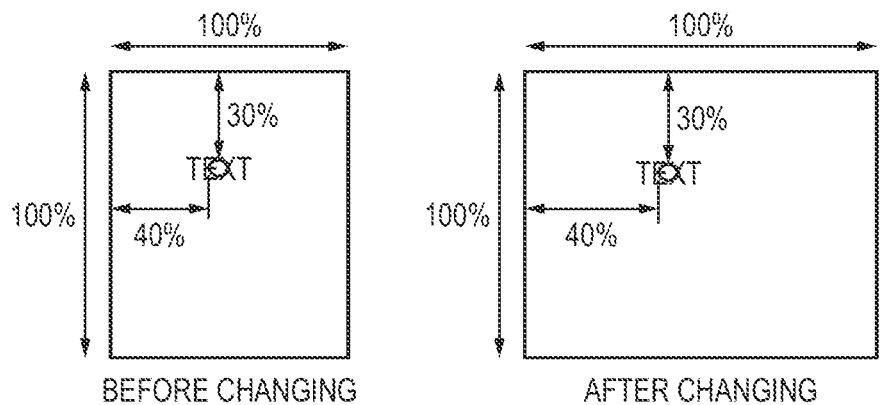
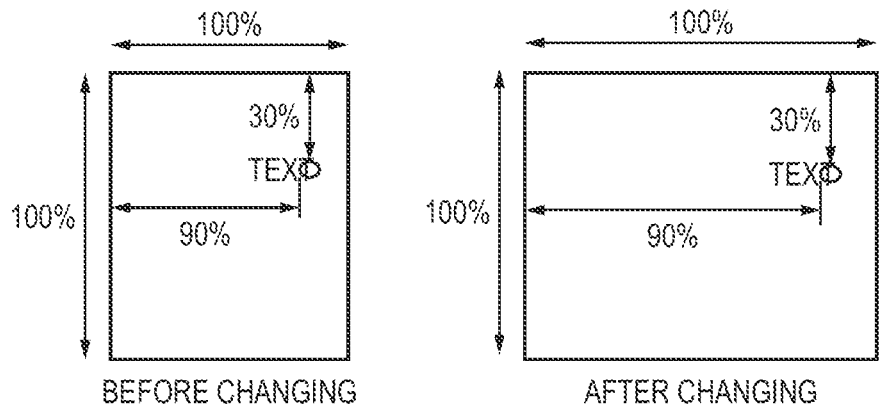

FIG. 7
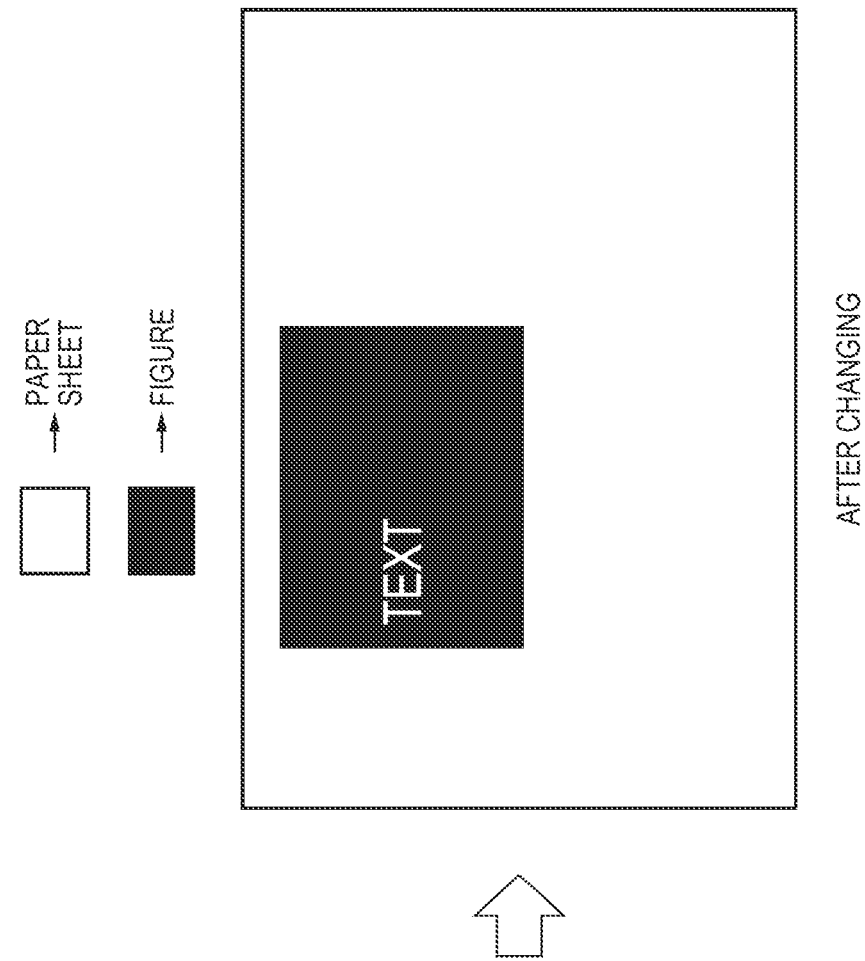

FIG. 9
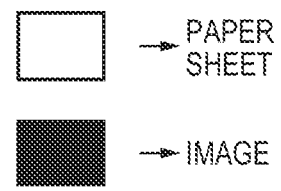
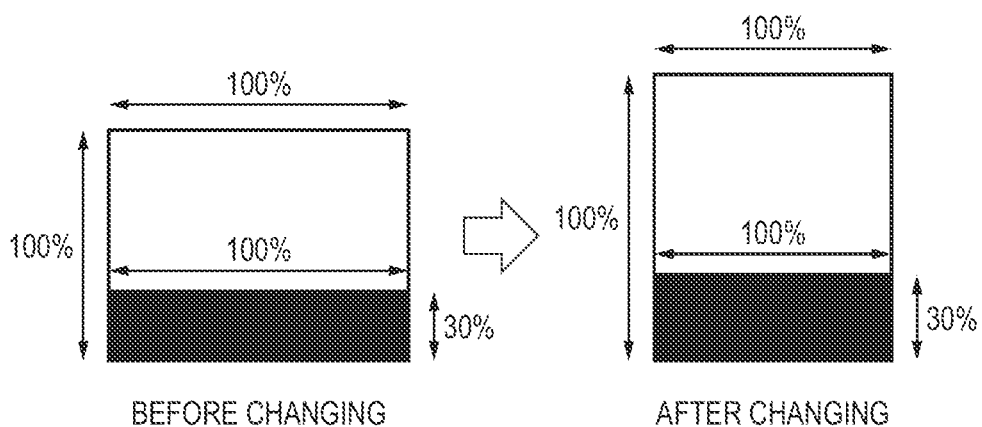
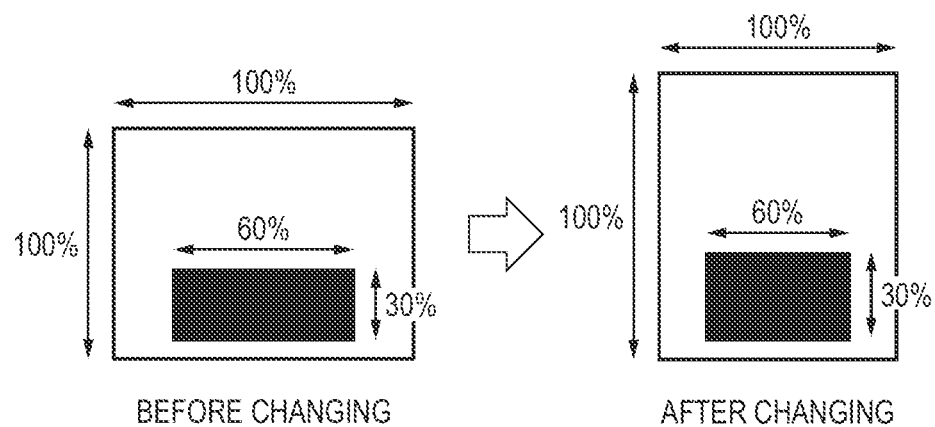

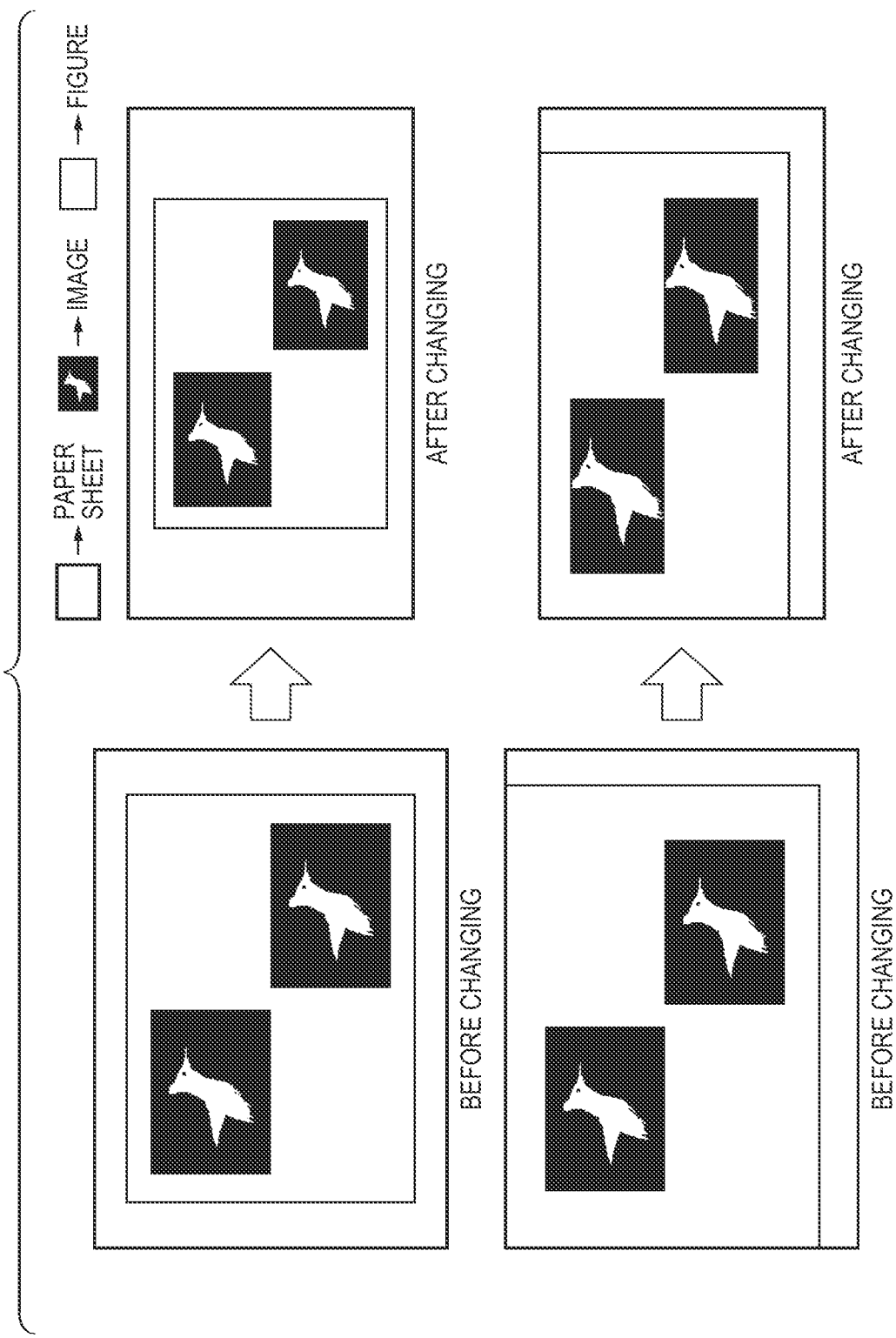

INFORMATION PROCESSING APPARATUS, METHOD, AND STORAGE MEDIUM THAT CHANGE A PAPER SIZE FROM A FIRST SIZE TO A DIFFERENT, SECOND SIZE, AND TO MAINTAIN AN ASPECT RATIO OF AN OBJECT

CROSS-REFERENCE TO PRIORITY APPLICATION

This application claims the benefit of Japanese Patent application No. 2022-191881 filed Nov. 30, 2022, which is hereby incorporated by reference herein in its entirety.

FIELD OF THE INVENTION

The present invention relates to an information processing apparatus, a method, and a storage medium.

DESCRIPTION OF THE RELATED ART

There is conventionally known a method of editing a document (document data) using application software (to be referred to as an "application" hereafter) on a personal computer. In this method, the paper size of a document can be changed to an arbitrary size. When changing the paper size of a document, the application generally enlarges/reduces an object such as a text or an image in the document, in accordance with the change of the paper size, thereby performing adjustment to prevent the object from projecting from a paper sheet (original). However, in a case when the aspect ratio of the paper size is changed (for example, the paper size is changed from portrait to landscape), if an object such as a text or an image in a document is simply enlarged/reduced, spaces are generated on the upper and lower sides and the left and right sides of the document. Japanese Patent Laid-Open No. 2000-322224 discloses a technique of, when changing the paper size, adjusting the aspect ratio of a table in a document in accordance with the aspect ratio of the paper size such that no spaces are generated in the document. The technique disclosed in Japanese Patent Laid-Open No. 2000-322224 is effective if the document is formed only by tables, and a document according to the aspect ratio of the paper size can be generated.

In the conventional technique, however, if the aspect ratio is similarly adjusted for a document including an object whose aspect ratio should be maintained, like a two-dimensional code such as a QR code or a clip art of a character, the two-dimensional code or the character is distorted. Thus, the conventional technique has a problem that, when adjusting the aspect ratio of a document to prevent spaces from being generated on a paper sheet, among objects included in the document, an object whose aspect ratio should be maintained is distorted. In addition, if an object whose aspect ratio should be maintained, for example, a two-dimensional code is distorted, data read from the two-dimensional code may be impossible.

SUMMARY OF THE INVENTION

The present invention provides a technique advantageous in suppressing distortion of an object included in a document caused by a change of the paper size of the document.

According to one aspect, the present invention provides an information processing apparatus for editing a document including a plurality of objects, including a change unit configured, based on a user instruction, to change a paper size of the document from a first paper size to a second paper size, different from the first paper size, and an adjustment unit configured to adjust a size of the object included in the document based on the second paper size, wherein the adjustment unit adjusts the size of a specific object in the plurality of objects such that an aspect ratio of the specific object is maintained.

Further aspects of the present invention will become apparent from the following description of exemplary embodiments with reference to the attached drawings.

BRIEF DESCRIPTION OF THE DRAWINGS

FIG. 5 is a view showing an example of adjustment processing according to information about objects in a document.

FIG. 6 is a view showing an example of adjustment processing of an object ("text") in a document.

FIG. 7 is a view showing an example of adjustment processing of an object ("text") in a document.

FIG. 9 is a view showing an example of adjustment processing of an object ("image") in a document.

FIG. 11 is a view showing an example of adjustment processing of an object ("image") in a document.

DESCRIPTION OF THE EMBODIMENTS

Figure 1:
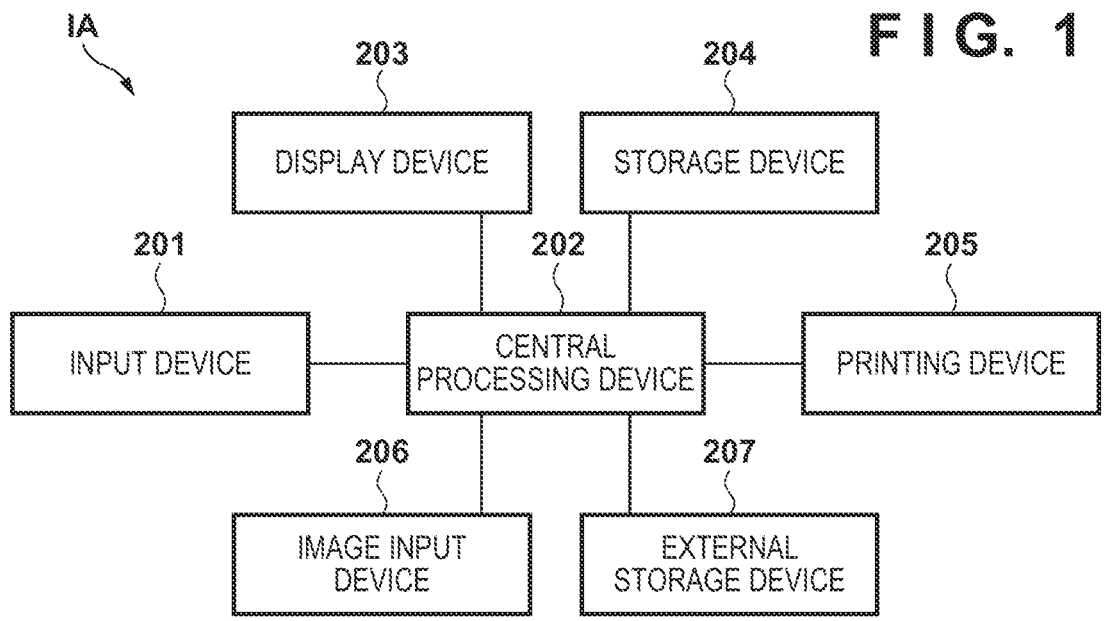
FIG. 1 is a view showing the configuration of an information processing apparatus on which a document editing application according to an aspect of the present invention operates.

Hereafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and a redundant description thereof is omitted.

FIG. 1 is a view showing the configuration of an information processing apparatus IA on which a document editing application according to an aspect of the present invention operates. The information processing apparatus IA is embodied as a personal computer in which a document editing application configured to edit a document (document data) is installed. A document that is an editing target of the document editing application may be a general office document, or may be a document with a specific application purpose, like a poster, a postcard, or presentation data. The document editing application has various functions for editing a document, and can, for example, resize, move, or rotate an object included in a document, or perform trimming processing for an image.

As shown in FIG. 1, the information processing apparatus IA includes an input device 201, a central processing device 202, a display device 203, a storage device 204, an image input device 206, and an external storage device 207. The input device 201 includes, for example, a keyboard or a mouse. The central processing device 202 performs management and control of the entire information processing apparatus IA, and document editing processing. The display device 203 includes, for example, a liquid crystal monitor configured to display a document. The storage device 204 includes a hard disk configured to constitute a file system and to store, on the system, the entity of the document editing application, document templates, fonts, and decoration data. A printing device 205 prints, on a medium such as a paper sheet, data (document) including texts, figures, and images created or edited by the information processing apparatus IA. The image input device 206 includes, for example, a film scanner, a flatbed scanner, a digital camera, or the like. The external storage device 207 includes a storage device corresponding to a medium used in a digital camera, or the like. In the information processing apparatus IA, image data stored in the external storage device 207 can be loaded as an object.

Figure 2:
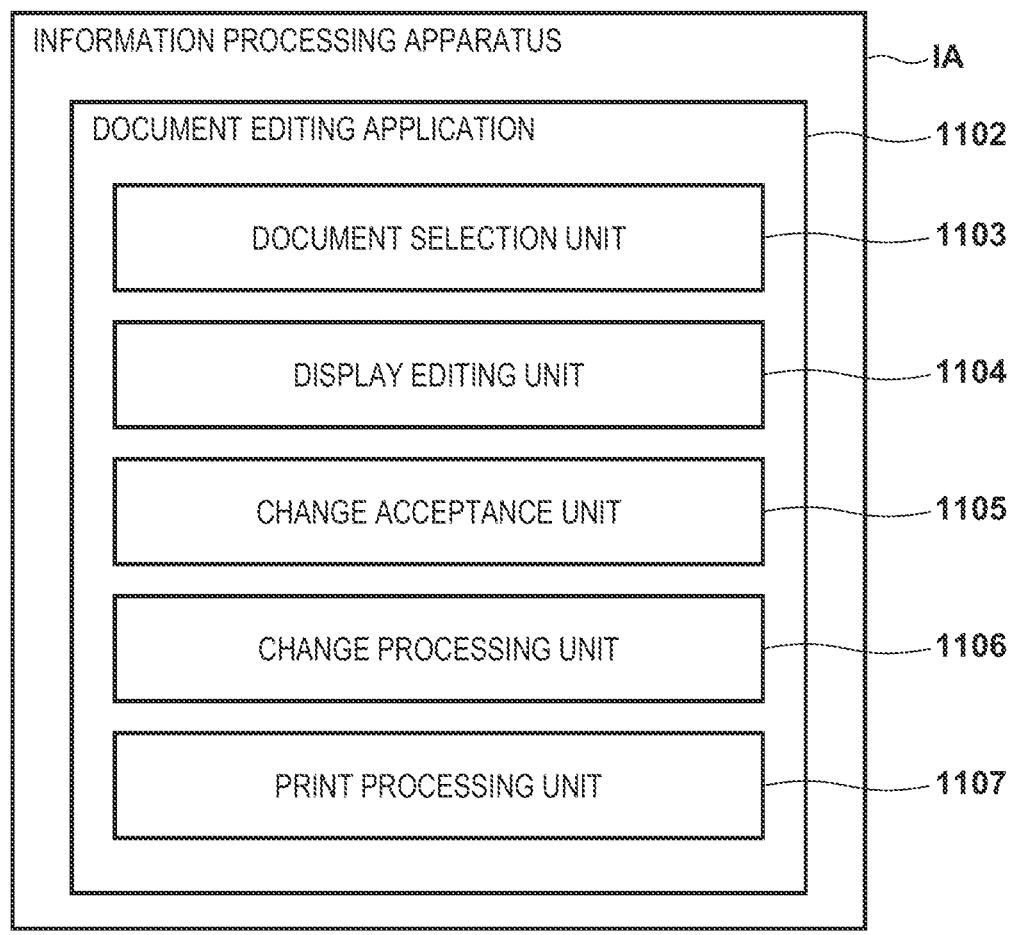
FIG. 2 is a view showing the configuration of the document editing application.

FIG. 2 is a view showing the configuration of a document editing application 1102 that operates on the information processing apparatus IA. A document selection unit 1103 has a function of selecting a document to be edited by a display editing unit 1104. The display editing unit 1104 has a function of displaying/editing the document selected by the document selection unit 1103. A change acceptance unit 1105 has a function of accepting a change of the paper size of the document edited by the display editing unit 1104. A change processing unit 1106 has a function of changing the paper size of the document in accordance with the paper size whose change is accepted by the change acceptance unit 1105. A print processing unit 1107 has a function of printing the document via the printing device 205.

Figure 3A:
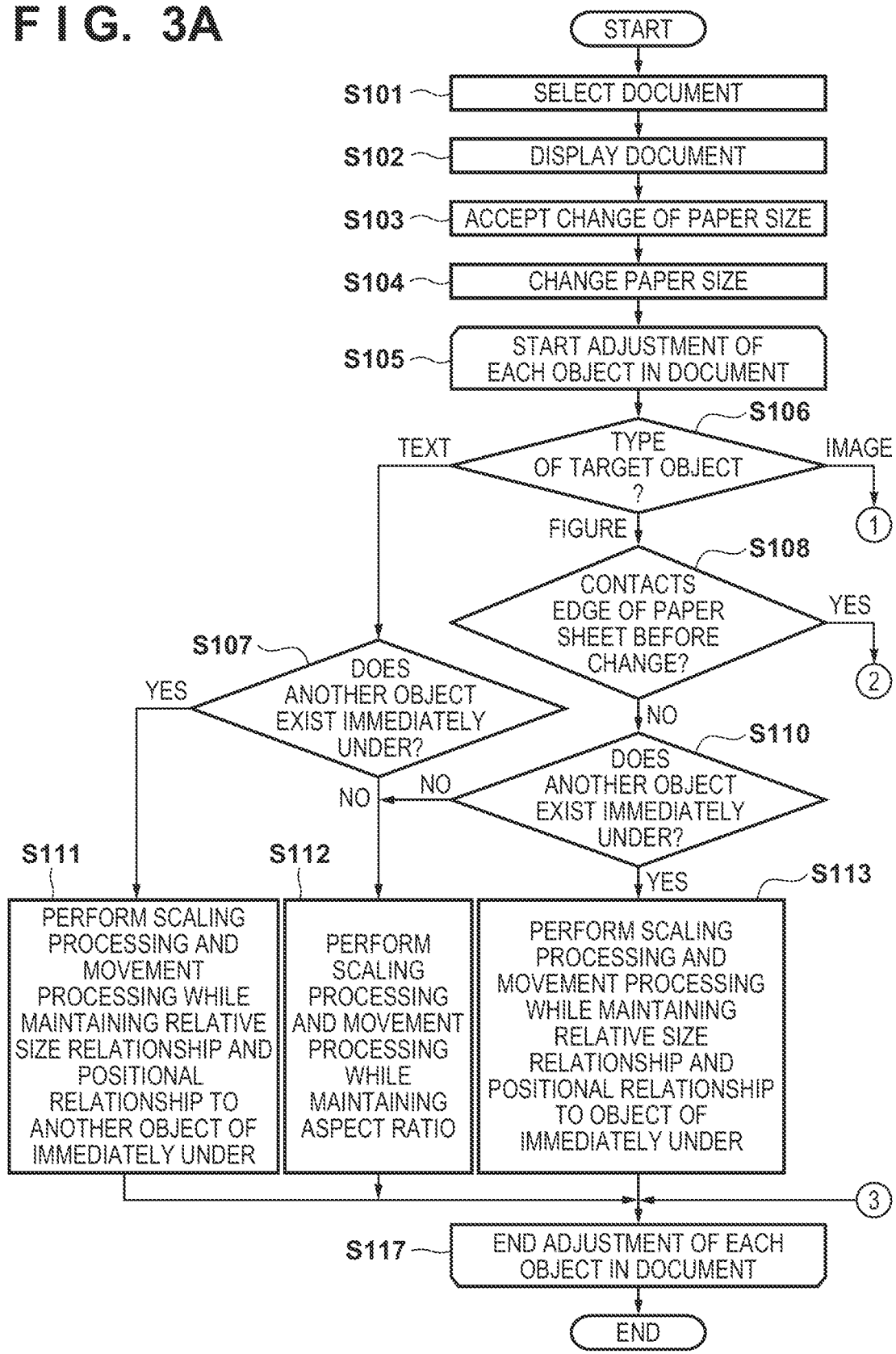
FIGS. 3A and 3B are flowcharts for explaining processing of changing the paper size of a document.
Figure 3B:
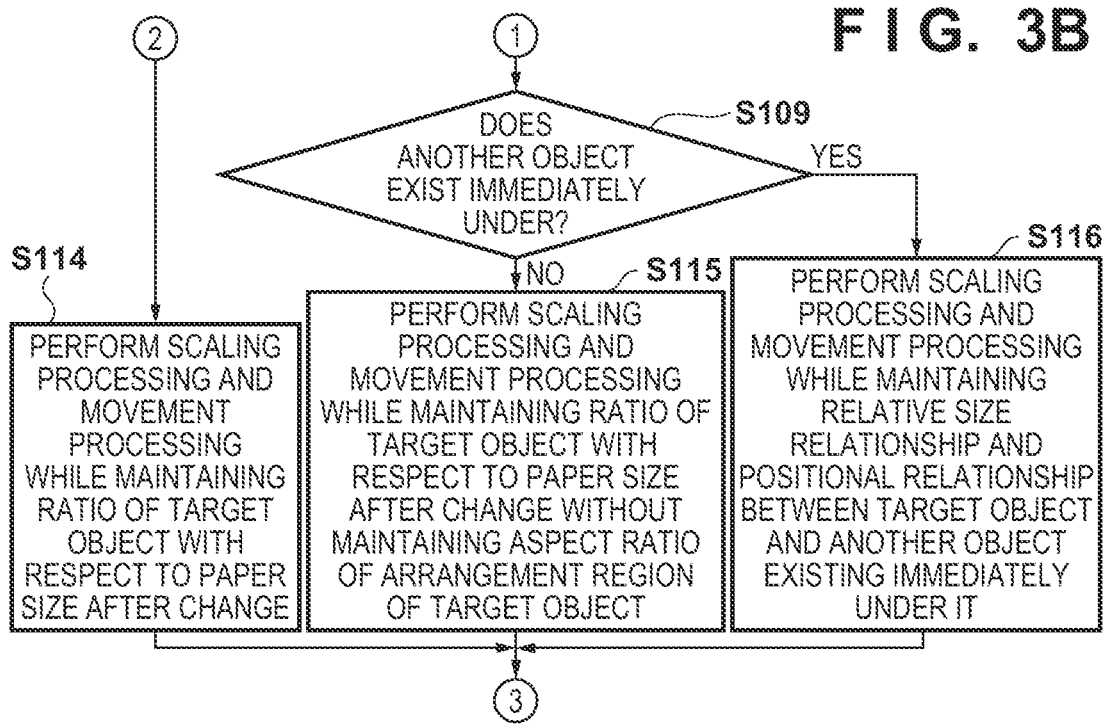

FIGS. 3A and 3B are flowcharts for explaining document editing processing of editing a document by the document editing application 1102, more specifically, processing (size change processing) of changing the paper size of a document, which is executed in the information processing apparatus IA. The processing of this flowchart is started by activating the document editing application 1102.

In step S101, the document selection unit 1103 selects a document that is an editing target. In the storage device 204, various documents according to application purposes are stored in advance as templates. For example, the display editing unit 1104 displays, on the display device 203, a list of document templates corresponding to the templates stored in the storage device 204 and accepts document selection from the user. The user selects, via the input device 201, a document to be used (a document that is an editing target) from the list of document templates displayed on the display device 203. Note that the document may be selected from documents prepared as templates in advance, as described above, or may be selected from documents created by the user in the past.

In step S102, the display editing unit 1104 displays, on the display device 203, the document selected, in step S101, from the documents stored in the storage device 204, in accordance with the user selection. The document displayed on the display device 203 is editable via the input device 201.

Figure 4:
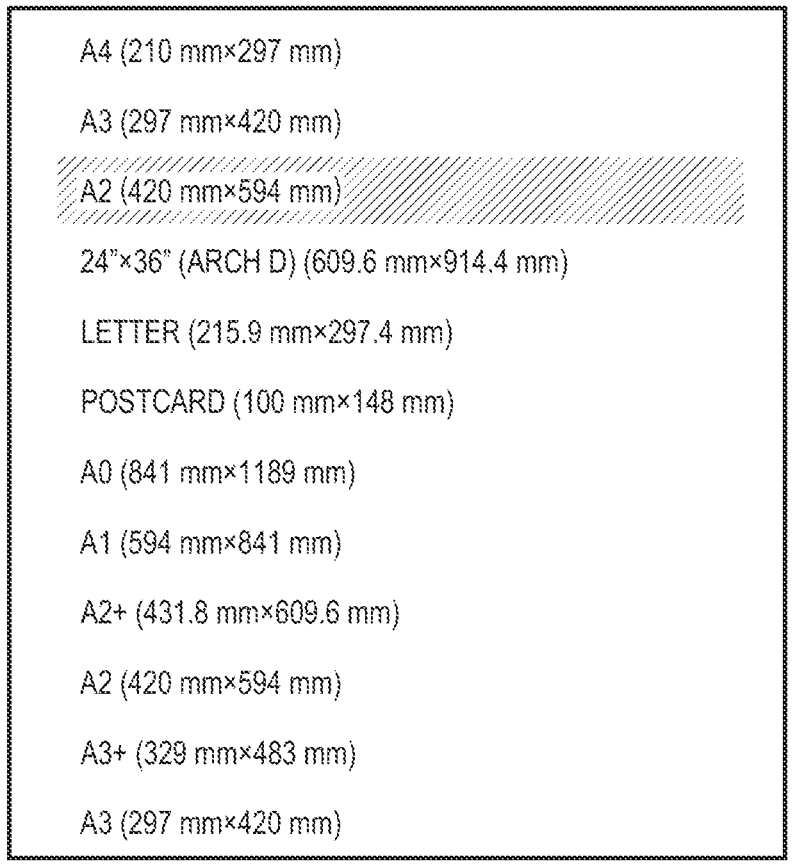
FIG. 4 is a view for explaining acceptance of a change of the paper size.

In step S103, the change acceptance unit 1105 accepts a change of the paper size for the document displayed in step S102. The change acceptance unit 1105, for example, displays a list of paper sizes, as shown in FIG. 4 on the display device 203, and accepts a change (selection) of the paper size from the user. The user selects, via the input device 201, the paper size to change (the paper size after the change) from the list of paper sizes displayed on the display device 203. If the document (document template) displayed in step S102 is created with a paper size "A2", a state in which "A2" is selected by default as a paper size in the list of paper sizes, as shown in FIG. 4, is displayed. Then, if the user selects the paper size to change, the change acceptance unit 1105 accepts the change of the paper size for the document displayed in step S102. As a case when the paper size of a document is changed, for example, a case can be considered where the paper size of a document to be printed by the printing device 205 is different from the paper size of the document (document template) displayed in step S102. The acceptance of the change of the paper size is not limited to the form as shown in FIG. 4. For example, instead of displaying a list of paper sizes and causing the user to make selection, whether to orient a paper sheet horizontally or vertically may be selected, or an arbitrary paper size may be set by numerical values. That is, the processing contents of this embodiment can be applied not only to a case when the aspect ratio changes along with the change of the paper size, but also, to a case when the paper size does not change, but the aspect ratio changes along with the change of the paper direction.

In step S104, the change processing unit 1106 changes the paper size of the document displayed in step S102 in accordance with the paper size accepted in step S103 (the paper size after the change). In this embodiment, the change processing unit 1106 functions as an adjustment unit that performs adjustment processing of adjusting, in accordance with the paper size of the document after the change, the size and position of each object included in the document, based on information about each object, as shown in steps S105 to S117. Here, the information about each object in the document includes at least one of information about the type of an object, information about the content of an object, and information about the arrangement state of an object in the document. As indicated as a routine by steps S105 and S117, the change processing unit 1106 selects one object in the document as the adjustment processing target object, and repeats the processes of steps S106 to S116 until all objects in the document are processed. Thus, in this embodiment, the document layout is automatically adjusted in accordance with the change of the paper size of the document, thereby saving the user's labor to manually adjust each object in the document.

Details of the processes of steps S106 to S116 of the size change processing shown in FIGS. 3A and 3B will be described with reference to FIG. 5. FIG. 5 is a view showing an example of adjustment processing according to information about objects in a document, that is, the types, the contents, and the arrangement states of objects. When changing the paper size of a document, the change processing unit 1106 adjusts the size and position of each object in the document, as shown in FIG. 5. A case when three types of objects in a document, that is, "text", "figure", and "image" exist will be described as an example.

In step S106, the change processing unit 1106 determines whether the type of the target object that is one object in the document is a "text", a "figure", or an "image" (determines the type of the target object). Note that, in this embodiment, a "figure" includes not only a rectangle, a circle, and the like, but also a clip art having a pattern and a two-dimensional code such as a QR Code®. In this embodiment, a figure, such as a rectangle or a circle, is an object created by the function of the document editing application 1102. A two-dimensional code is not limited to a two-dimensional code created by the function of the document editing application 1102, and if a photo/image file is loaded, and the specifications allow even a two-dimensional code included in the arranged photo/image file to be recognized, all two-dimensional codes included in the document can be the target. Alternatively, only a two-dimensional code created by the function of the document editing application 1102 may be handled as a two-dimensional code of this embodiment, and a photo/image file including a two-dimensional code may be handled, not as a two-dimensional code, but as an image object. If the type of the target object is "text", the process advances to step S107, if the type of the target object is "figure", the process advances to step S108, and if the type of the target object is "image", the process advances to step S109.

In step S107, the change processing unit 1106 determines whether another object exists immediately under the target object ("text"). In this embodiment, if the type of the target object is "text", the processing branches depending on whether another object exists immediately under this target object. Whether another object exists is determined, based on the region information of the "text" that is the target object and the region information of an object existing in a layer on the lower side of the "text". More specifically, if an object that has a region completely including the region of the "text" exists in the lower layer, it is determined that another object exists immediately under the target object, and the process advances to step S111. On the other hand, if an object that has a region completely including the region of the "text" does not exist in the lower layer, it is determined that another object does not exist immediately under the target object, and the process advances to step S112.

In step S112, the change processing unit 1106 performs scaling (enlargement/reduction) processing and movement processing of the "text" in accordance with the paper size of the document after the change while maintaining the aspect ratio of the "text" that is the target object.

In scaling processing of the "text", the font size of the "text" that is the target object is enlarged/reduced in accordance with the magnification of a side of a paper sheet with a lower scaling ratio. For example, when changing a paper size of 100 cm long×50 cm wide to a paper size of 50 cm long×30 cm wide, the font size of the "text" is changed to ½ (=50 cm÷100 cm) based on the magnification of the vertical side with the lower scaling ratio. At this time, the font size of the "text" is changed, but the aspect ratio of the font is not changed (maintained). This is because, if the aspect ratio of the font is changed, the font is distorted if the change amount of the paper size is great, and the design of the "text" gives an impression different from that before the change of the paper size at a high possibility.

In movement processing of the "text", the position of the "text" that is the target object is moved in accordance with the change of the aspect ratio of the paper size of the document. For example, as shown in FIG. 6, the position of "text" is moved such that the ratio of the position of the reference point of the "text" is the same before and after the change of the paper size. Note that (the position of) the reference point when moving the "text" is changed in accordance with the alignment setting (left alignment, centering, or right alignment) of the "text", as shown in FIG. 6. If the alignment setting of "text" is left alignment, the center on the left side of the "text" is set to the reference point. If the alignment setting of "text" is centering, the center of the "text" is set to the reference point. If the alignment setting of "text" is right alignment, the center on the right side of the "text" is set to the reference point. If "text" is vertical writing, the top of the center, the center, or the bottom of the center of the "text" is set to the reference point in accordance with the alignment setting. When the reference point when moving the "text" is thus changed, for example, if the paper size of a document in which a plurality of "texts" of left alignment are arranged vertically with their left ends aligned is changed, each "text" can be moved while aligning the positions of the left ends. This can suppress break of the layout of the "texts".

In step S111, the change processing unit 1106 performs scaling (enlargement/reduction) processing and movement processing of the "text" while maintaining the relative size relationship and positional relationship between the "text" that is the target object and another object existing immediately under the "text".

For example, as shown in FIG. 7, consider a case when "figure" (black) exists in the upper portion of the document, and "text" exists on the left side on the figure. In this case, in the document after the change of the paper size, the font of the "text" is reduced in accordance with reduction of the "figure", and the "text" is arranged at a position on the left side of the "figure". In FIG. 7, since the "text" is aligned left, the center on the left side of the "text" is set to the reference point, and the positional relationship between the reference point of the "figure" and the reference point of the "text" is maintained. Thus, scaling processing and movement processing are performed in accordance with another object existing immediately under the "text" that is the target object, thereby suppressing loss of balance of the positional relationship (arrangement relationship) between these.

In step S108, the change processing unit 1106 determines whether the "figure" that is the target object contacts an edge of a paper sheet before the change of the paper size. Whether the "figure" contacts an edge of a paper sheet, before the change of the paper size, is determined by defining a rectangle surrounding the "figure" and determining whether at least two of the vertices of the rectangle are located on edges of a paper sheet. More specifically, based on the coordinate values of the vertices of the rectangle surrounding the "figure" and the coordinate values of the edges of the paper sheet, it is determined whether the "figure" contacts an edge of the paper sheet before the change of the paper size. There can also be considered a case when the "figure" that is the target object does not contact an edge of the paper sheet completely (without any deviation). For this reason, an allowable range (margin) may be set from an edge of the paper sheet, and it may be determined whether the "figure" contacts an edge of the paper sheet before the change of the paper size. If the "figure" does not contact an edge of the paper sheet before the change of the paper size, the process advances to step S110. On the other hand, if the "figure" contacts an edge of the paper sheet before the change of the paper size, the process advances to step S114.

In step S110, the change processing unit 1106 determines whether another object exists immediately under the target object ("figure"), like step S107. If another object does not exist immediately under the target object ("figure"), the process advances to step S112. On the other hand, if another object exists immediately under the target object ("figure"), the process advances to step S113.

Note that, in a case when the target object is a "figure", if the "figure" does not contact an edge of the paper sheet before the change of the paper size, steps S112 and S113 that are processes after that are basically the same as the processes in a case when the target object is "text". Hence, in step S112, the change processing unit 1106 performs scaling (enlargement/reduction) processing and movement processing of the "figure" in accordance with the paper size of the document after the change, while maintaining the aspect ratio of the "figure" that is the target object. However, in movement processing of the "figure", (the position of) the reference point when moving the "figure" is always located at the center of the "figure". In a case when the target object is "figure" as well, the aspect ratio of the "figure" is maintained, thereby suppressing distortion of the pattern held by a clip art or a two-dimensional code, as in a case when the target object is "text". Also, in step S113, the change processing unit 1106 performs scaling (enlargement/reduction) processing and movement processing of the "figure" while maintaining the relative size relationship and positional relationship between the "figure" that is the target object and another object existing immediately under the "figure".

Figure 8:
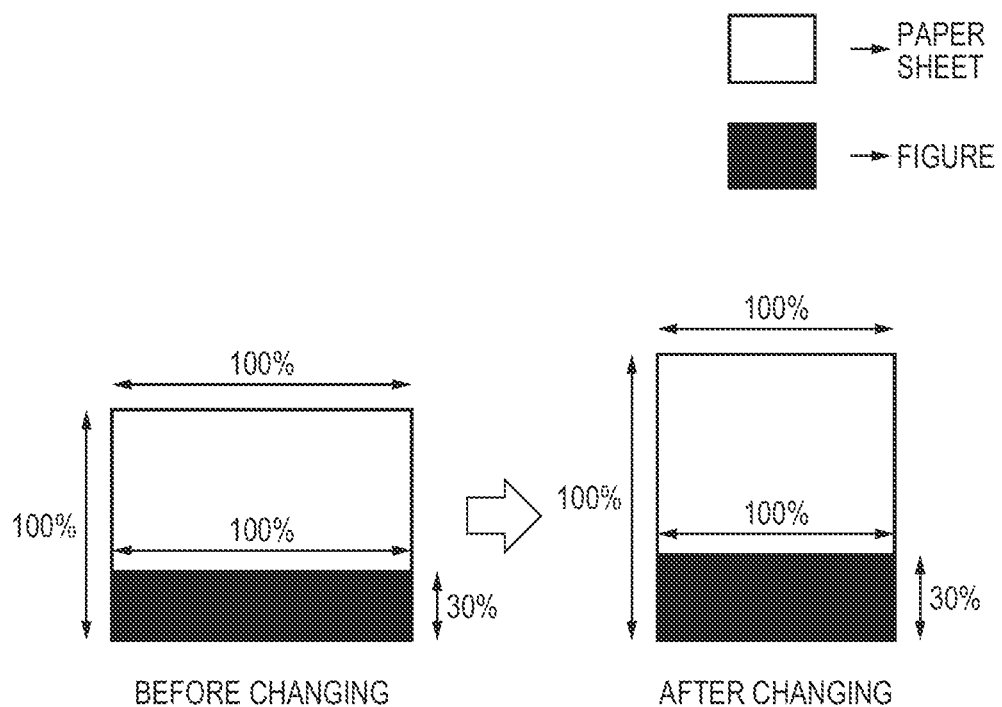
FIG. 8 is a view showing an example of adjustment processing of an object ("figure") in a document.

In step S114, the change processing unit 1106 performs scaling (enlargement/reduction) processing and movement processing of the "figure" while maintaining the ratio of the "figure" with respect to the paper size after the change without maintaining the aspect ratio of the "figure" that is the target object. This is because, if "figure" (except two-dimensional codes) contacts an edge of a paper sheet, spaces are noticeable, unless the "figure" is scaled in accordance with the aspect ratio of the paper size after the change. More specifically, as shown in FIG. 8, a "figure" (black) that contacts edges of a paper sheet is scaled such that the ratio of the vertical and horizontal sizes of the "figure" with respect to the whole paper sheet is maintained, before and after the change of the paper size. At this time, the "figure" is scaled without maintaining the aspect ratio of the "figure". When moving the "figure" as well, the "figure" is arranged such that the "figure" contacts an edge of a paper sheet, while maintaining the ratio of the "figure" with respect to the whole paper sheet.

In step S109, the change processing unit 1106 determines whether another object exists immediately under the target object ("image"), like step S107 or S110. If another object does not exist immediately under the target object ("image"), the process advances to step S115. On the other hand, if another object exists immediately under the target object ("image"), the process advances to step S116.

Figure 10:
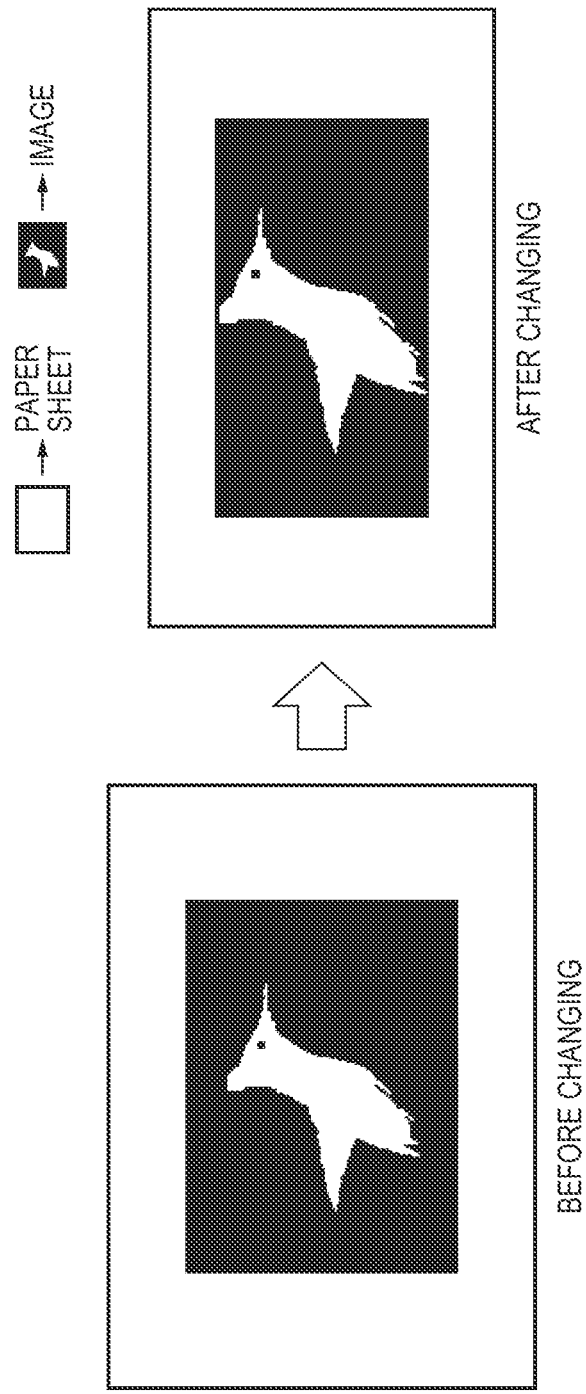
FIG. 10 is a view showing an example of adjustment processing of an object ("image") in a document.

In step S115, as shown in FIG. 9, the change processing unit 1106 performs scaling (enlargement/reduction) processing and movement processing of the "image" while maintaining the ratio of the "image" that is the target object with respect to the whole paper sheet. At this time, the "image" is scaled without maintaining the aspect ratio of the "image". To prevent the "image" from being distorted, the trimming region of the "image" is changed in accordance with the aspect ratio of the arrangement region of the "image" after the change of the paper size. More specifically, as shown in FIG. 10, if the arrangement region of the "image" after the change of the paper size is horizontally long, the trimming region of the "image" is changed such that the "image" has the same aspect ratio as the arrangement region of the "image". Similarly, if the arrangement region of the "image" after the change of the paper size is vertically long, the "image" is trimmed vertically long.

In step S116, the change processing unit 1106 performs scaling (enlargement/reduction) processing and movement processing of the "image" while maintaining the relative size relationship and positional relationship between the "image" that is the target object and another object existing immediately under the "image". For example, assume a case when a "figure" that is another object exists immediately under an "image", as shown in FIG. 11. In this case, if the aspect ratio of the "figure" is not changed, the aspect ratio of (the arrangement region of) the "image" is not changed, either. If the aspect ratio of the "figure" is changed, the aspect ratio of the "image" is changed in accordance with the aspect ratio of the "figure" after the change.

As described above, in this embodiment, for each of objects included in the document, it is determined whether the aspect ratio should be maintained when changing the paper size of the document, in accordance with the type, the content, and the arrangement state of the object. This determination is done by the change processing unit 1106, as described above (steps S106 to S110). For an object whose aspect ratio should be maintained in the objects included in the document, the change processing unit 1106 adjusts the size and position of the object such that the aspect ratio of the object is maintained. In other words, when adjusting the aspect ratio of the document in accordance with the paper size of the document after the change, the size and position of each object are adjusted in accordance with the type, the content, and the arrangement state of each object in the document. This can suppress distortion of an object whose aspect ratio should be maintained in the objects of the document. More specifically, it is possible to suppress distortion of a pattern held by a clip art or a two-dimensional code in a document.

In this embodiment, a case when the aspect ratio of a "text" or "figure" that is an object in a document is maintained has been described as an example. However, the present invention is not limited to this. For example, to permit some distortion in a "text" or a "figure" in a document, an allowable range may be provided (the change rate of) the aspect ratio of these. In this case, the size of the "text" or "figure" is adjusted such that the aspect ratio is maintained within a predetermined allowable range. For example, the aspect ratio of a "text" or "figure" is adjusted until the aspect ratio exceeds the predetermined allowable range, and beyond the predetermined allowable range, the aspect ratio of the "text" or "figure" is not adjusted anymore.

Also, in this embodiment, a case when a "text" or "figure" in a document is moved, in accordance with the aspect ratio of the paper size, has been described as an example. An allowable range may be provided for the moving range. In this case, the "text" or "figure" in the document is moved until the "text" or "figure" exceeds a predetermined moving range, and, beyond the predetermined moving range, the "text" or "figure" is not moved anymore.

Alternatively, a plurality of candidate documents (layouts) created while changing the conditions of the presence/absence of adjustment of the aspect ratio, the above-described allowable range (the change rate of the aspect ratio), or the moving range may be displayed, and a document (layout) desired by the user may be selected from the plurality of candidate documents. For example, the change processing unit 1106 adjusts the size of an object included in a document using a plurality of different aspect ratios, thereby generating a plurality of candidate documents including objects corresponding to the plurality of aspect ratios. The plurality of candidate documents thus generated are displayed on the display device 203, and the user selects, via the input device 201, one candidate document as a document after the change of the paper size from the plurality of candidate documents displayed on the display device 203.

In this embodiment, a case when if the target object included in the document is a "figure", and the "figure" contacts an edge of a paper sheet, the size and position of the "figure" are adjusted without maintaining the aspect ratio of the "figure" has been described as an example. However, the present invention is not limited to this. For example, whether to maintain the aspect ratio of the "figure" may be determined in accordance with the content of the "figure". More specifically, if (the content of) the "figure" is an object painted in one color, or if the "figure" is an object, such as a table, it is considered that some distortion of the "figure" is permitted, and, therefore, the aspect ratio of the "figure" may not be maintained. Also, depending on the ratio of the "figure" that is the target object in contact with an edge of a paper sheet (the arrangement state in the document), whether to maintain the aspect ratio of the "figure" may be determined, or the method of scaling processing or movement processing may be changed. Note that the ratio of the "figure" in contact with the edge of the paper sheet includes, for example, the number of sides of the "figure" in contact with the edge of the paper sheet, in addition to the number of vertices of the "figure" in contact with the edge of the paper sheet. For example, if the "figure" hardly contacts the edge of the paper sheet, the aspect ratio of the "figure" may be maintained. If two or more sides of the "figure" contact the edges of the paper sheet, the aspect ratio of the "figure" may not be maintained.

In this embodiment, a case when the aspect ratio of a "text" is maintained independently of the content of the "text" that is the target object has been described as an example. However, whether to maintain the aspect ratio of the "text" may be determined in accordance with the words of the "text" or the font type. For example, if the "text" includes only alphanumeric characters, or if the influence of the font on the design is little even if the "text" is distorted, the adjustment of the aspect ratio of the "text" may be permitted.

In this embodiment, a case when the document editing application 1102 (change processing unit 1106) automatically determines whether to maintain the aspect ratio of each object included in a document has been described. However, the present invention is not limited to this. For example, the user may set, of objects included in a document, an object whose aspect ratio should be maintained. More specifically, a setting unit is provided, which is configured to set a condition associated with an object whose aspect ratio should be maintained when changing the paper size of a document in accordance with a user setting (input). For each object included in a document, it is determined, based on the condition set by the setting unit, whether the aspect ratio should be maintained when changing the paper size of the document.

Embodiment(s) of the present invention can also be realized by a computer of a system or an apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., an application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., a central processing unit (CPU), or a micro processing unit (MP)) and may include a network of separate computers or separate processors to read out and to execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), a digital versatile disc (DVD), or a Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus for editing a document including a plurality of objects, the plurality of objects including a first type of object and a second type of object, different from the first type of object, the apparatus comprising:
   at least one processor and at least one memory coupled to the at least the processor and having stored thereon instructions, when executed by the at least the processor, cooperating to function as:
   a change unit configured, based on a user instruction, to change a paper size of the document from a first paper size to a second paper size, different from the first paper size; and
   an adjustment unit configured to adjust a size of the object included in the document based on the second paper size, wherein the adjustment unit adjusts the size of a first type of object in the plurality of objects such that an aspect ratio of the specific object is maintained and an aspect ratio of the second type of object corresponds to an aspect ratio of the second paper size.

2. The apparatus according to claim 1, wherein the first type of object is a two-dimensional code.

3. The apparatus according to claim 2, wherein the two-dimensional code that is the first type of object is created by a function provided in editing software configured to edit the document.

4. The apparatus according to claim 1, wherein the first type of object is a text object including a text.

5. The apparatus according to claim 1, wherein the first type of object is a figure object that contacts an edge of a paper sheet of the document in figure objects, except a two-dimensional code.

6. The apparatus according to claim 5, wherein the figure object is created by a function provided in editing software configured to edit the document.

7. The apparatus according to claim 1, wherein the adjustment unit adjusts the size of each second type of object such that the aspect ratio of each second type of object is maintained in a predetermined allowable range.

8. The apparatus according to claim 1, wherein the adjustment unit adjusts the size of the object included in the document using a plurality of different aspect ratios, thereby generating a plurality of candidate documents including objects corresponding to the plurality of aspect ratios, and
   the at least one processor and the at least one memory further cooperate to function as a selection unit configured to select one candidate document as a document after the change of the paper size from the plurality of candidate documents generated by the adjustment unit.

9. The apparatus according to claim 1, wherein the adjustment unit adjusts a position of the object included in the document in accordance with the second paper size.

10. The apparatus according to claim 1, wherein the adjustment unit adjusts the size of the object included in the document if a direction of a paper sheet is changed, even if the paper size is not changed.

11. A method executed in an information processing apparatus for editing a document including a plurality of objects, the plurality of objects including a first type of object and a second type of object, different from the first type of object, the method comprising:
 changing, based on a user instruction, a paper size of the document from a first paper size to a second paper size, different from the first paper size; and
 adjusting a size of the object included in the document based on the second paper size, wherein the adjusting adjusts the size of a first type of object in the plurality of objects such that an aspect ratio of the specific object is maintained and an aspect ratio of the second type of object corresponds to an aspect ratio of the second paper size.

12. A non-transitory computer readable storage medium storing a program configured to cause a computer to function as an information processing apparatus for editing a document including a plurality of objects, the plurality of objects including a first type of object and a second type of object, different from the first type of object, and including:
 a change unit configured, based on a user instruction, to change a paper size of the document from a first paper size to a second paper size, different from the first paper size; and
 an adjustment unit configured to adjust a size of the object included in the document based on the second paper size, wherein the adjustment unit adjusts the size of a first type of object in the plurality of objects such that an aspect ratio of the specific object is maintained and an aspect ratio of the second type of object corresponds to an aspect ratio of the second paper size.

* * * * *